United States Patent [19]

Poe et al.

[11] Patent Number: 4,761,354

[45] Date of Patent: Aug. 2, 1988

[54] UNIVERSAL BATTERY POST CAP

[75] Inventors: David T. Poe, Yorktown; Joseph T. Crouse, Anderson, both of Ind.

[73] Assignee: General Motors Corporation, Detroit, Mich.

[21] Appl. No.: 64,534

[22] Filed: Jun. 22, 1987

[51] Int. Cl.[4] ................................................ H01M 2/32
[52] U.S. Cl. ...................................... 429/121; 429/65; 174/138 F
[58] Field of Search .......................... 429/121, 122, 65; 174/138 F, 188, 189, 74 A, 5 R

[56] References Cited

U.S. PATENT DOCUMENTS

| 1,176,942 | 3/1916 | Bliss | 429/121 |
| 1,315,135 | 9/1919 | LaRocco | 429/121 X |
| 3,956,576 | 5/1976 | Jensen et al. | 429/121 X |
| 4,206,273 | 6/1980 | Mandil | 429/121 X |
| 4,239,836 | 12/1980 | Picciolo | 429/65 |

Primary Examiner—Anthony Skapars
Attorney, Agent, or Firm—Lawrence B. Plant

[57] ABSTRACT

A universal, one-piece-molded, protective cap adapted to fit both small and large diameter battery terminal posts. The cap includes a body portion having an accordion pleated wall which is molded to tightly fit small diameter terminals but expandable to fit large diameter terminal posts. Restraining means at both ends of the body help maintain constrictive engagement of the post by the cap. Openings at both ends of the pleats permit substantially uninhibited flexure of the pleats to effect expansion of the body.

4 Claims, 2 Drawing Sheets

UNIVERSAL BATTERY POST CAP

This invention relates to electric storage batteries and more particularly to a protective cap for the terminals thereof.

BACKGROUND OF THE INVENTION

Electric storage batteries typically employ one or the other of two general types of terminals. One type has an internal, typically threaded, opening for receiving a fastener (e.g., bolt) which holds the battery cable in place. One such terminal is disclosed in Rowls et al U.S. Pat. No. 3,775,730. The other type employs an external post projecting outwardly from the battery which post may comprise a threaded stud for mating with an eyelet on the battery cable or a tapered/conical post often referred to as an SAE terminal post and described in SAE Standard J-537. Some replacement SLI batteries have both types of terminals.

Rowls et al type terminals are protected from damage by virtue of their being recessed within the container wall. External post type terminals, however, are susceptible to impact damage which can interfere with their ability to properly receive an appropriate cable connector. Moreover, external terminals, being more exposed, can result in the inadvertent discharge of the battery incident to short circuiting of the terminals. Accordingly, battery manufacturers commonly provide such posts with protective caps.

It is common practice in the battery industry that the positive terminal post have a larger diameter than the negative terminal post (see SAE J-537) so as to prevent attachment of the wrong (i.e., opposite polarity) cable connectors thereto.

As a result, at least two different sized protective caps were heretofore required for each set of external terminal posts. This required not only the need to inventory two different caps but also two different sets of tooling for manufacturing such caps. Moreover, valuable production was lost in changing over from one set of tooling to the next.

It is an object of the present invention to provide a unique, universal, one piece expandable battery terminal post protective cap which is adaptable to terminals having different diameters. This and other objects and advantages of the present invention will become more readily apparent from the detailed description thereof which follows.

BRIEF DESCRIPTION OF THE INVENTION

The present invention comprehends a universal, one-piece-molded, nonconductive protective cap for an external terminal post of a battery, which cap is expandable to accommodate both small and large diameter terminal posts. The cap of the present invention includes a substantially resilient annular body defining a cavity for receiving the terminal post. The annular body is formed from a corrugated wall including a plurality of inwardly projecting accordion pleats which permit expansion of the as-molded body to accommodate terminals of different diameters. The pleats each have a bendable ridge which engages the terminal in an interference fit. The ridge preferably includes a crushable rib extending substantially the entire length thereof. The crushable rib substantially retains its integrity when the cap is fitted about a small diameter terminal post, but crushes or deforms when the cap is fitted about a larger diameter terminal post. In this regard, the rib not only insures a tight fit on the smaller diameter terminal posts but also facilitates placement of the cap on the larger diameter posts by providing less drag on the surface of the large diameter post than would otherwise occur when flattening rib-free pleats. A tensioning means is provided on one end of the body to prevent overstretching of the body and so as to hold the body in tight, constrictive engagement with the terminal post walls. An integral, substantially resilient flange extends radially outboard the other end of the body and defines a mouth for receiving the terminal post into the body portion of the cap. The flange, like the tensioning means, prevents overstretch of the body and helps hold the body in place on the post.

DETAILED DESCRIPTION OF SPECIFIC EMBODIMENTS

The invention may better be understood when considered in the light of the following detailed description of certain specific embodiments thereof which is given hereafter in conjunction with the several figures in which.

Figure 1:
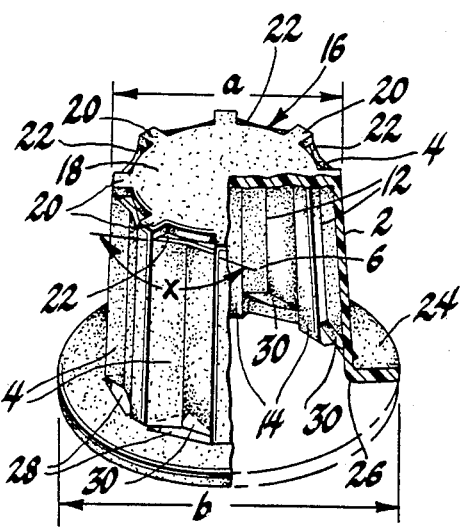
FIG. 1 is a broken-away, perspective view of a protective cap made in accordance with the present invention.
Figure 2:
FIG. 2 is an elevational view of the top of a battery whose terminal posts are covered with caps in accordance with the present invention.
Figure 3:
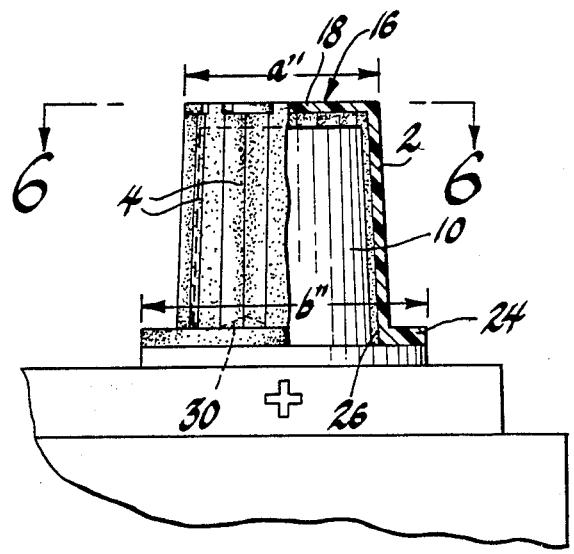
FIG. 3 is a broken-away, elevational view of the cap of FIG. 1 in place on a positive, SAE-type, conical terminal post.
Figure 4:
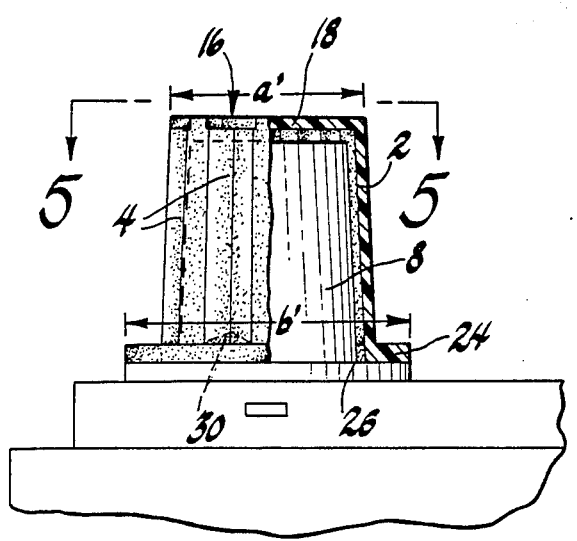
FIG. 4 is a view similar to FIG. 3 but showing the cap of the present invention in place over a negative, SAE-type, conical terminal post which is smaller than the positive post of FIG. 3.

As best shown in FIG. 1 a one-piece-molded, terminal post cap in accordance with the present invention has a main body portion comprising a corrugated wall 2 including a plurality of pleats 4 projecting inwardly towards a central cavity 6 which is adaptable to receive either a small battery terminal post 8 (see FIG. 4) or a large battery terminal 10 (see FIG. 3). Each pleat 4 includes a ridge 12 which engages in an interference fit the outer annular surface of the terminal post. A plurality of valleys having valley floors 14 lie between the several pleats 4.

An integrally molded cover 16 is provided on the top end of the cap and serves as a means to apply tension to the top end of the body to prevent over expansion of the body and thereby insure constrictive engagement of the post by the body. More specifically, the tensioning cover 16 includes a central hub portion 18 and a plurality of substantially resilient connectors 20 extending radially therefrom into engagement with the wall 2 at the valley floors 14. When the cap is positioned over the terminal post, the connectors 20 will stretch slightly so as to permit expansion of the body as the pleats 4 flatten against the side wall of the post. Openings 22 are provided at the upper ends of the pleats 4 between the connectors 20 to permit substantially uninhibited flexure of the accordion pleats 4 and thereby facilitate the flattening of the pleats 4 as required to accommodate the different sized terminal posts.

A resilient flange 24 is integrally molded to the other end of the body opposite the tensioning cover 16. The flange 24 expands diametrically to allow slight expansion of the body portion as the pleats flatten against the side wall of the post. The flange 24 defines a mouth 26 through which the terminal posts 8 or 10 are admitted to the cavity 6. The flange 24 engages the body at the valley floors 14 and define a plurality of openings 28 at the ends of the pleats 4 which, like the openings 22 at the top of the pleats, permits substantially uninhibited flexure of the pleats 4 when the cap is fitted over the terminal posts. Chamfers 30 are provided at the lower ends of the pleats 4 adjacent the flange 24 to serve as lead-ins when fitting the cap over large posts 10.

Figure 5:
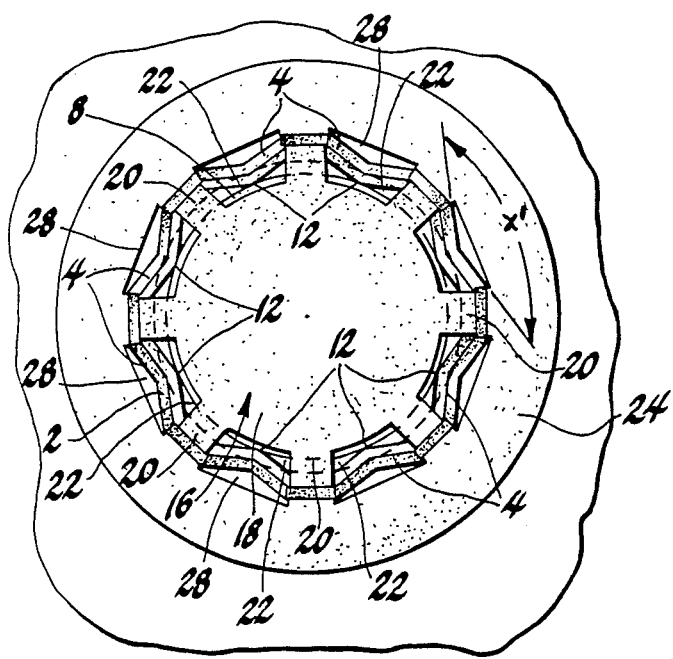
FIG. 5 is a view in the direction 5—5 of FIG. 4.
Figure 6:
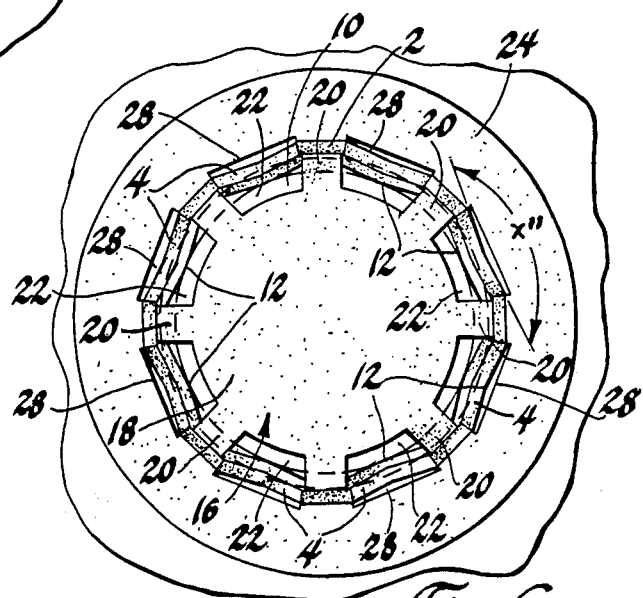
FIG. 6 is a view in the direction 6—6 of FIG. 3.

FIGS. 3 and 6 illustrate the extent of the flattening experienced by the accordion pleats 4 when the cap is positioned over large, positive SAE-type terminal posts. In this regard, the outside diameter a" at the top of the terminal cap, as well as the outside diameter b" of the flange 24 at the bottom of the cap, will be slightly greater than the corresponding dimensions a' and b' for the same cap positioned over a negative terminal of smaller diameter (see FIGS. 4 and 5) which in turn is slightly larger than the corresponding dimensions a and b of the as-molded cap of FIG. 1. Similarly, the included angle X" for the substantially flattened pleat 4 in FIG. 6 will be greater than the corresponding angles X and X' for the as-molded cap of FIG. 1 and the slightly expanded cap fitted over the smaller post 8 of FIGS. 4 and 5.

Figure 7:
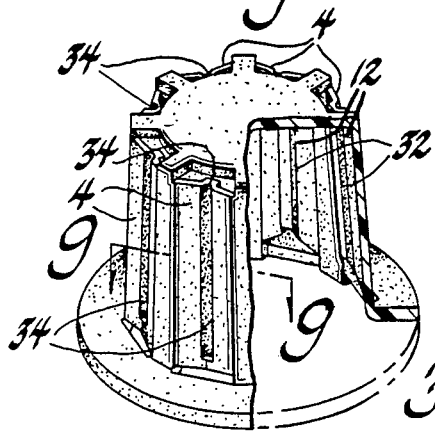
FIG. 7 is a broken-away, perspective view of another embodiment of the present invention.
Figure 8:
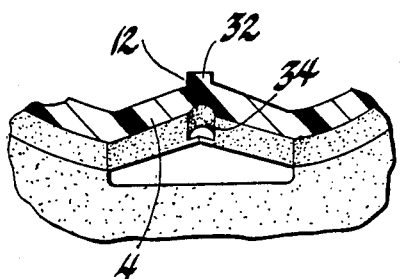
FIG. 8 is an enlarged view in the direction 9—9 of FIG. 7.

FIGS. 7 and 8 depict a preferred embodiment of the present invention wherein, in addition to features discussed above, the ridges 12 each include a small (i.e., about 0.01 inch high) crushable rib 32. In this regard, the material forming the cap, and hence the rib 32, will be hard enough as to permit the rib to substantially maintain its integrity (i.e., size and shape) when engaging the smaller diameter posts, yet be soft enough that the rib will crush or deform when pressed onto larger diameter posts. Caps made from unfilled, low density polyethylene, such as petrothene NA 202 provided by the U.S. Industrial Chemicals Co. or EPP PE-178 provided by the ElPaso Chemical Co., have proven to be effective for this purpose and ribs 32 made therefrom have provided tight fitting caps for smaller terminals while at the same time improving the ease with which the caps can be fitted over the larger posts. In this latter regard, while the pressure employed to press the cap onto the larger post does crush or deform the rib, relatively little additional post-to-cap area contact is created (i.e., as compared to flattening of the pleats) and hence less friction or drag results during fitting of the cap. Relief 34 provided at the underside of the rib 32 insures that the pleat 4 can still bend readily at the ridge 12.

Figure 9:
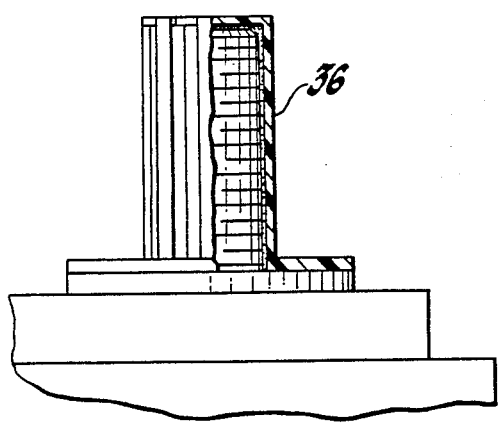
FIG. 9 is a broken-away, elevational view of another embodiment of the cap of the present invention adapted to fit over a threaded stud type terminal post.

FIG. 9 illustrates another embodiment of the present invention wherein the body portion 36 of the cap has a substantially cylindrical shape specifically adapted for fitting to a threaded stud type terminal having little or no taper thereto.

While the invention has been disclosed primarily in terms of specific embodiments thereof it is not intended to be limited thereto but rather only to the extent set forth hereafter in the claims which follow.

The embodiments of the invention in which an exclusive property or privilege is claimed are defined as follows:

1. A universal, one-piece, nonconductive, protective cap adapted to engage either small or large diameter battery terminal posts, said cap comprising:

a substantially resilient, annular body comprising a corrugated wall defining a cavity for receiving a said post, said wall having a plurality of inwardly-projecting accordion pleats defining a plurality of valleys therebetween, said pleats each having a bendable ridge for engaging a said post and permitting radial expansion of said body when said cap is positioned about a said post;

tensioning means on one end of said body in part defining said cavity, said means including a hub and a plurality of substantially resilient connectors extending radially from said hub, said connectors each engaging a floor of one of said valleys and defining a plurality of first openings between said connectors at the ends of said pleats at said one end of said body; and an integral, substantially resilient flange extending radially outwardly from the other end of said body, said flange having an inboard edge joined to said floors at the other end of said body so as to define a plurality of second openings at the other ends of said pleats;

said first and second openings serving to permit flexure of said pleats and expansion of said body to accommodate said small or large diameter posts.

2. A cap in accordance with claim 1 wherein said annular body comprises a hollow frustum tapered to accommodate SAE-type terminal posts.

3. A cap in accordance with claim 1 wherein said other ends of said pleats are chamfered to facilitate placement of said cap onto said terminals.

4. A cap in accordance with claim 1 wherein said ridge includes a crushable rib which substantially retains its integrity when engaging a said small diameter terminal but deforms when engaging a said large diameter terminal.

* * * * *